United States Patent
Thomsen et al.

(10) Patent No.: US 10,119,521 B2
(45) Date of Patent: Nov. 6, 2018

(54) ESTIMATING AND CONTROLLING LOADING EXPERIENCED IN A STRUCTURE

(71) Applicant: VESTAS WIND SYSTEMS A/S, Aarhus N (DK)

(72) Inventors: Jesper Sandberg Thomsen, Hadsten (DK); Soren Dalsgaard, Hadsten (DK); Asger Svenning Andersen, Tjele (DK); Lars Risager, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 667 days.

(21) Appl. No.: 14/369,545

(22) PCT Filed: Dec. 20, 2012

(86) PCT No.: PCT/DK2012/050491
§ 371 (c)(1),
(2) Date: Jun. 27, 2014

(87) PCT Pub. No.: WO2013/097860
PCT Pub. Date: Jul. 4, 2013

(65) Prior Publication Data
US 2014/0363292 A1   Dec. 11, 2014

Related U.S. Application Data

(60) Provisional application No. 61/582,171, filed on Dec. 30, 2011, provisional application No. 61/594,927, filed on Feb. 3, 2012.

(30) Foreign Application Priority Data

Dec. 30, 2011 (DK) .................................. 2011 70773
Feb. 3, 2012 (DK) .................................. 2012 70056

(51) Int. Cl.
*G01L 1/26* (2006.01)
*G01M 5/00* (2006.01)
(Continued)

(52) U.S. Cl.
CPC ............... *F03D 7/04* (2013.01); *F03D 7/042* (2013.01); *F03D 17/00* (2016.05); *G01L 1/26* (2013.01);
(Continued)

(58) Field of Classification Search
CPC . F03D 7/04; F03D 7/042; F03D 17/00; G01L 1/26; G01M 5/0041; G01M 5/0066
See application file for complete search history.

(56) References Cited

U.S. PATENT DOCUMENTS

| | | | |
|---|---|---|---|
| 4,281,553 A * | 8/1981 | Datta-Barua | G01F 1/329 73/861.24 |
| 6,940,186 B2 * | 9/2005 | Weitkamp | F03D 7/042 290/44 |

(Continued)

FOREIGN PATENT DOCUMENTS

| | | |
|---|---|---|
| EP | 2 138 717 A2 | 12/2009 |
| GB | 2 448 940 A | 11/2008 |

(Continued)

OTHER PUBLICATIONS

International Search Report and Written Opinion for PCT/DK2012/050491, dated May 8, 2013.
DK Search Report for PA 2011 70773, dated Aug. 12, 2012.

*Primary Examiner* — Logan Kraft
*Assistant Examiner* — Christopher R Legendre
(74) *Attorney, Agent, or Firm* — Patterson + Sheridan, LLP

(57) ABSTRACT

A method of estimating an amount of undesired loading experienced by at least a portion of a structure (100) is (Continued)

provided. The structure (100) may be, for example, a wind turbine generator (WTG) and the portion for which undesired loading is estimated may be, for example, a rotor (130) of the WTG. The method includes receiving a first signal characterizing instantaneous stress experienced by a component (140) of the structure (100) and filtering out at least a portion of the received first signal that corresponds to the desired loading experienced by the component to produce a first filtered signal. The amount of undesired loading experienced by the at least a portion of the structure (100) is estimated based at least partially on the first filtered signal.

14 Claims, 11 Drawing Sheets

(51) Int. Cl.
*F03D 7/04* (2006.01)
*F03D 17/00* (2016.01)

(52) U.S. Cl.
CPC ........ *G01M 5/0041* (2013.01); *G01M 5/0066* (2013.01); *Y02B 10/30* (2013.01)

(56) References Cited

U.S. PATENT DOCUMENTS

| | | | |
|---|---|---|---|
| 7,964,979 B2* | 6/2011 | Miranda | F03D 7/0224 290/44 |
| 9,279,715 B2* | 3/2016 | Hedin | G01M 13/045 |
| 2002/0097039 A1* | 7/2002 | Khuri-Yakub | G01L 1/005 324/95 |
| 2004/0057828 A1 | 3/2004 | Bosche | |
| 2006/0070435 A1* | 4/2006 | LeMieux | F03D 15/00 73/168 |
| 2010/0004878 A1* | 1/2010 | Volanthen | F03D 1/065 702/42 |
| 2014/0363292 A1* | 12/2014 | Thomsen | G01M 5/0041 416/1 |

FOREIGN PATENT DOCUMENTS

| | | | | |
|---|---|---|---|---|
| GB | 2 478 600 A | | 9/2011 | |
| WO | WO 9957435 A1 * | | 11/1999 | F03D 1/065 |
| WO | 2011/042369 A2 | | 4/2011 | |

* cited by examiner

ESTIMATING AND CONTROLLING LOADING EXPERIENCED IN A STRUCTURE

FIELD OF THE INVENTION

The present invention relates generally to methods and systems for estimating an amount of loading experienced in a structure, and to methods and systems for controlling the amount of loading experienced in the structure.

BACKGROUND OF THE INVENTION

Many structures (including stationary structures, such as bridges, buildings, or the like, as well as moving structures or machines, such as vehicles, cranes, wind turbines, or the like) operate in environments with unpredictable conditions, exposing the structures to high levels of mechanical loading, including extreme loading and cyclic fatigue loading. To increase reliability and operating lifetime, such structures are often made with costly high strength materials and are engineered to avoid failure under high levels of loading. However, high levels of loading may occur sporadically in some environments and therefore might be experienced relatively infrequently over the lifetime of a structure. Accordingly, such structures are often over-engineered and/or operated in an overly conservative mode for the conditions they are exposed to most of the time, thereby reducing overall return on investment.

Moreover, predicting the levels of loading to which a structure might be exposed over its lifetime can be difficult, particularly when some of the sources of loading are non-deterministic, such as weather conditions, terrain conditions, and/or operator actions. For example, aircraft are subject to non-deterministic weather conditions and operator actions. As another example, a ground transport structure, such as a fuel tanker, is subject to non-deterministic terrain conditions and operator actions. A third example, which is referred to throughout the following description by way of example but not limitation, is a wind turbine generator (WTG). WTGs, in particular the blades of WTGs, are subject to cyclic fatigue loading as well as extreme loading due to non-deterministic wind conditions over their operating lifetime.

A WTG is an energy conversion system that converts kinetic wind energy into electrical energy for utility power grids. Specifically, wind incident on blades of the WTG causes a rotor of the WTG to rotate. The mechanical energy of the rotating rotor in turn is converted into electrical energy by an electrical generator. Because wind conditions can vary significantly from one location to another, a WTG is typically engineered or selected from among different reliability classes of WTGs to withstand the expected wind conditions of the location.

However, as noted above, because weather conditions are non-deterministic, the expected wind conditions as measured when siting a location might not fully represent the actual wind conditions experienced by the WTG after installation. Consequently, the loading experienced by the WTG (or portions thereof) can exceed levels for which the WTG is designed. Discrepancy between predicted wind conditions and actual wind conditions could result from a number of sources including, for example, normal variations in wind conditions from year to year, or insufficient information in wind condition measurements. Many WTGs have the ability to detect extreme wind conditions, including wind gusts and high levels of wind shear, and are often derated or shut off to avoid excessive damage upon detection of extreme wind conditions. However, accurate detection of extreme wind conditions is difficult and, even if wind conditions are measured accurately, they are a crude proxy for the actual loading experienced by the WTG due to the wind conditions. These and related limitations of the present state of the art significantly constrain the efficient operation of certain structures, such as WTGs, and impose the use of unnecessarily conservative control measures to avoid the risk of damage and extend operable lifetime.

At least one system has been developed for sensing and controlling loads on a WTG. For example, U.S. Pat. No. 7,160,083 ("the '083 patent"), issued to Pierce et al. on Jan. 9, 2007, describes a method and apparatus for reducing fatigue loading on turbine components. Particularly, the system of the '083 patent receives signals from load sensors, determines a load condition based on the signals, and determines a response to the determined load condition. For example, the pitch of the turbine's blades may be altered to reduce loading. While the system of the '083 patent may be effective for sensing the occurrence of and reducing loads on a wind turbine rotor, the system does not appear to address cyclic fatigue loading, which may be quite small in amplitude but results in damage over time. In addition, some forms of loading on a structure component may be expected or desired. However, the system of the '083 patent does not appear to distinguish desired loading from undesired loading and therefore appears to treat all forms of loading as undesirable.

SUMMARY OF THE INVENTION

According to a first aspect the invention provides a method of estimating an amount of undesired loading experienced by at least a portion of a structure. The structure may be, for example, a wind turbine generator (WTG) and the portion for which undesired loading is estimated may be, for example, a rotor of the WTG. The method includes receiving a first signal characterizing instantaneous stress experienced by a component of the structure and filtering out at least a portion of the received first signal that corresponds to the desired loading experienced by the component to produce a first filtered signal. The amount of undesired loading experienced by the at least a portion of the structure is estimated based at least partially on the first filtered signal.

By filtering out a portion of the first signal characterizing instantaneous stress that corresponds to the desired loading, an estimate of the undesired loading can advantageously be provided to a controller or logged in a record for analysis.

In an embodiment of the method according to the first aspect of the invention, estimating the amount of undesired loading includes calculating a standard deviation of the first filtered signal.

In another embodiment of the method according to the first aspect of the invention, estimating the amount of undesired loading includes calculating one or more spectral moments of the first filtered signal. In a further embodiment, the one or more spectral moments of the first filtered signal includes the Nth spectral moment, where N is the Wöhler coefficient corresponding to a material out of which the component is made.

In yet another embodiment of the method according to the first aspect of the invention, estimating the amount of undesired loading includes detecting an envelope of the first filtered signal. In a further embodiment, detecting the envelope of the first filtered signal is performed with a time constant of less than about five seconds.

In yet another embodiment of the method according to the first aspect of the invention, estimating the amount of undesired loading includes calculating an online rain-flow cycle count of the first filtered signal.

In yet another embodiment of the method according to the first aspect of the invention, the component that experiences the stress characterized by the received and filtered first signal is a blade of a WTG.

In yet another embodiment of the method according to the first aspect of the invention, the first signal characterizing instantaneous stress experienced by the component is received from a strain gauge disposed on the component.

In yet another embodiment of the method according to the first aspect of the invention, the at least a portion of the received first signal that is filtered out includes components of the received first signal that are below a predetermined threshold frequency.

In yet another embodiment of the method according to the first aspect of the invention, the structure is a WTG and the component is a first one of a plurality of blades of a rotor of the WTG. In this embodiment, the method further includes estimating an amount of undesired loading experienced by the first blade based at least partially on the first filtered signal. In addition, a second signal characterizing instantaneous stress experienced by a second one of the plurality of blades is received. At least a portion of the received second signal that corresponds to desired loading experienced by the second blade is filtered out to produce a second filtered signal. Then, an amount of undesired loading experienced by the second blade is estimated based at least partially on the second filtered signal. Next, the amount of undesired loading experienced by the at least a portion of the WTG is estimated based at least partially on the estimated amounts of undesired loading experienced by the first and second blades. In a further embodiment, estimating the amount of undesired loading experienced by the at least a portion of the WTG includes selecting a maximum one of 1) the estimated amount of undesired loading experienced by the first blade, and 2) the estimated amount of undesired loading experienced by the second blade.

In yet another embodiment of the method according to the first aspect of the invention, filtering the received first signal includes filtering the received first signal to remove one or more portions that correspond to loading experienced by the component due to a first wind phenomenon. In a further embodiment, the first wind phenomenon is one of turbulence and wind shear. In a further embodiment, the method further includes filtering the received first signal to produce a second filtered signal in which at least the following signal portions are removed: one or more portions of the received first signal that correspond to desired loading experienced by the component; and one or more portions of the received first signal that correspond to loading experienced by the component due to a second wind phenomenon. The first and second filtered signals are then scaled relative to each other, and the amount of undesired loading experienced by the at least a portion of the structure is estimated based at least partially on the scaled first and second filtered signals. The first wind phenomenon may be turbulence and the second wind phenomenon may be wind shear, or vice-a-versa.

In a further embodiment of the method according to the first aspect of the invention in which the received first signal is filtered to remove one or more portions that correspond to loading associated with a first wind phenomenon, the structure is a WTG. The WTG includes a rotor with one or more blades that cause the rotor to rotate in response to wind forces, the component is a blade of the rotor, and the one or more portions that correspond to loading experienced by the component due to a first wind phenomenon include frequency components of the received first signal that are within a pass band centered around a rotational frequency of the rotor. Alternatively, the one or more portions that correspond to loading experienced by the component due to a first wind phenomenon include frequency components of the received first signal that are outside a stop band centered around the rotational frequency of the rotor.

According to a second aspect the invention provides a method of controlling an amount of undesired loading experienced by at least a portion of a structure. The method includes receiving a first signal characterizing instantaneous stress experienced by a component of the structure and filtering the received first signal to produce a first filtered signal in which at least a portion that corresponds to desired loading experienced by the component is removed. The amount of undesired loading experienced by the at least a portion of the structure is estimated based at least partially on the first filtered signal and the amount of undesired loading experienced is controlled based at least partially on the estimated amount of undesired loading.

Filtering out a portion of the first signal characterizing instantaneous stress that corresponds to the desired loading advantageously facilitates more direct control of the undesired loading while permitting desired loading.

In one embodiment according to the second aspect of the invention, the structure is a WTG and controlling the amount of undesired loading experienced includes at least one of overrating and derating the WTG. In a further embodiment, controlling the amount of undesired loading experienced includes derating the WTG if the estimated amount of undesired loading is higher than a predetermined threshold value, and overrating the WTG if the estimated amount of undesired loading is lower than the predetermined threshold value. Alternatively, in a further embodiment, controlling the amount of undesired loading experienced includes derating the WTG if the estimated amount of undesired loading is higher than a first predetermined threshold value, and overrating the WTG if the estimated amount of undesired loading is lower than a second predetermined threshold value that is lower than the first predetermined threshold value.

In another embodiment according to the second aspect of the invention, the structure is a WTG and the component is a first one of a plurality of blades of a rotor of the WTG. In addition, the method further includes estimating an amount of undesired loading experienced by the first blade based at least partially on the first filtered signal, and receiving a second signal characterizing instantaneous stress experienced by a second one of the plurality of blades. At least a portion of the received second signal that corresponds to desired loading experienced by the second blade is filtered out to produce a second filtered signal. An amount of undesired loading experienced by the second blade is then estimated based at least partially on the second filtered signal. Next, the amount of undesired loading experienced by the at least a portion of the WTG is estimated based at least partially on the estimated amounts of undesired loading experienced by the first and second blades. In this embodiment controlling the amount of undesired loading experienced may then be based at least partially on the estimated amount of undesired loading experienced by the at least a portion of the WTG.

In another embodiment, according to the second aspect of the invention, the structure is a WTG and the component is a first one of a plurality of blades of a rotor of the WTG. In addition, the method further includes estimating an amount of undesired loading experienced by the first blade based at least partially on the first filtered signal, and receiving a second signal characterizing instantaneous stress experienced by a second one of the plurality of blades. At least a portion of the received second signal that corresponds to desired loading experienced by the second blade is filtered out to produce a second filtered signal. An amount of undesired loading experienced by the second blade is then estimated based at least partially on the second filtered signal. Next, the amount of undesired loading experienced by the at least a portion of the WTG is estimated by selecting a maximum one of: 1) the estimated amount of undesired loading experienced by the first blade, and 2) the estimated amount of undesired loading experienced by the second blade. In this embodiment controlling the amount of undesired loading experienced may be then based at least partially on the maximum undesired loading estimate. For example, the maximum undesired loading estimate may be compared to a reference level.

According to a third aspect the invention provides a system for controlling an amount of undesired loading experienced by at least a portion of a structure. The system includes a load estimator and a controller. The load estimator is configured to estimate the amount of undesired loading experienced by the at least a portion of the structure based at least partially on an estimate of the amount of undesired loading experienced by a component of the structure and the controller is configured to control the amount of undesired loading experienced by the at least a portion of the structure based at least partially on the estimated amount of undesired loading experienced by the at least a portion of the structure. The load estimator includes a first filter configured to produce a first filtered signal by filtering out one or more portions of a first signal that characterizes instantaneous stress experienced by the component of the structure, the one or more filtered out portions including a portion corresponding to the desired loading experienced by the component. The load estimator further includes a first signal processing unit configured to process the first filtered signal to produce the estimate of the amount of undesired loading experienced by the component.

Filtering out a portion of the first signal characterizing instantaneous stress that corresponds to the desired loading advantageously facilitates more direct control of the undesired loading while permitting desired loading.

In one embodiment according to the third aspect of the invention, the structure is a WTG and the component is a first one of a plurality of blades of a rotor of the WTG. In addition, the load estimator further includes a second filter configured to produce a second filtered signal by filtering out one or more portions of a second signal, the second signal characterizing instantaneous stress experienced by a second one of the plurality of blades, and the one or more filtered out portions including a portion corresponding to the desired loading experienced by the second blade. The load estimator also includes a second signal processing unit configured to process the second filtered signal to produce an estimate of the amount of undesired loading experienced by the second blade. The load estimator of this embodiment is configured to estimate the amount of undesired loading experienced by the at least a portion of the WTG based at least partially on the estimate of the amount of undesired loading experienced by the first blade and the estimate of the amount of undesired loading experienced by the second blade.

In another embodiment, according to the third aspect of the invention, the structure is a WTG having a rotor and the component is a blade of the rotor. Moreover, the one or more portions of the first signal filtered out by the first filter module include one or more portions that correspond to loading experienced by the component due to a first wind phenomenon. In a further embodiment, the first wind phenomenon is either turbulence or wind shear. In a further embodiment, the first filter module is further configured to produce a second filtered signal by filtering out a portion corresponding to the desired loading experienced by the component and a portion of the first signal that corresponds to loading experienced by the component due to a second wind phenomenon. In addition, the first signal processing unit of the load estimator further comprises a scaling unit that scales the first filtered signal relative to the second filtered signal, and the first signal processing unit is further configured to process the scaled first and second filtered signals to produce the estimate of the amount of undesired loading experienced by the component.

In another embodiment, according to the third aspect of the invention, the system includes a WTG. The WTG, in turn, includes the load estimator, the controller, a rotor including one or more blades that cause the rotor to rotate in response to wind forces, and a generator configured to receive a torque input from the rotor and to generate electricity. In this embodiment, the at least a portion of the structure includes at least one of the one or more blades of the rotor and the component of the structure includes a blade of the rotor.

According to a fourth aspect the invention provides a method of estimating an amount of loading experienced by at least a portion of a structure. The method includes receiving a signal characterizing instantaneous stress experienced by a component of the structure, and detecting an envelope of the signal to produce an estimate of the amount of loading experienced by the at least a portion of the structure.

Detecting the envelope of the signal advantageously facilitates on-line (i.e., real time) production of an accurate estimate of the amount of loading experienced by the at least a portion of the structure.

In an embodiment according to the fourth aspect of the invention, the envelope is detected with a detector having a rise time and a decay time, the decay time being longer than the rise time.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Example methods and systems described herein can be used to protect structural portions of a structure from damage due to excessive loading. Wind turbine generators (WTGs), in particular the blades of WTGs, are subject to cyclic fatigue loading due to wind forces, rotational motion, and gravity. Over time, the fatigue loading the blades undergo can cause cracking and eventually severe damage, thereby shortening the useful lifetime of the WTG. However, not all loading is undesirable. At least some of the methods and systems described below are directed to resolving problems associated with monitoring and controlling loads in a way that distinguishes desirable loads from undesirable loads. For example, one example embodiment provides an estimate of the amount of loading experienced by blades on a WTG that excludes desired loading. Moreover, in certain embodiments, the estimate is provided with sufficient timeliness that harmful loading can promptly be mitigated. Moreover, although a WTG is frequently referred to herein as an example of a structure that experiences loading, other structures including, e.g., air, sea, and ground transport vehicles, bridges, cranes, and other structures that operate in environments that expose them to non-deterministic loading may also benefit from practicing the disclosed methods and systems.

Figure 1:
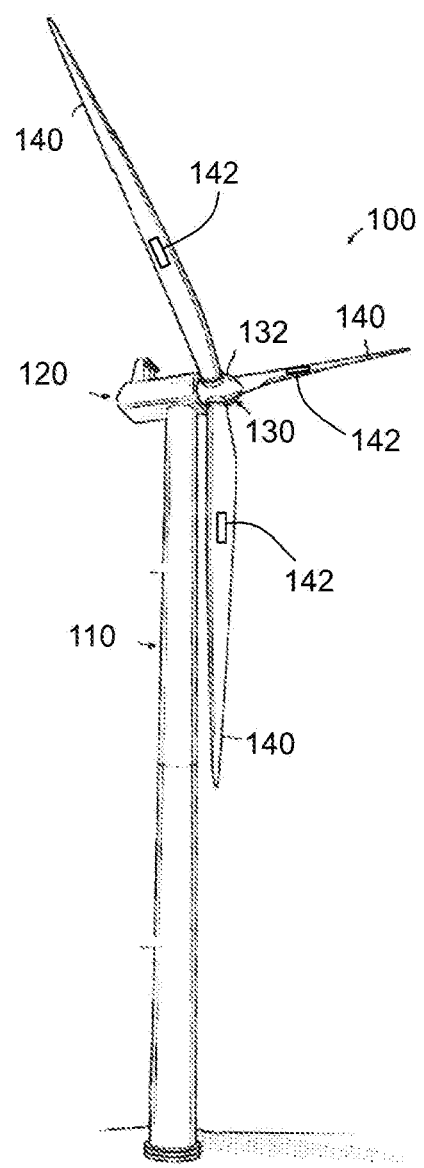
FIG. 1 shows a general structure of a WTG, which is an example structure that experiences loading.

FIG. 1 illustrates an example WTG 100 according to an embodiment. As illustrated in FIG. 1, the WTG 100 includes a tower 110, a nacelle 120, and a rotor 130. In one embodiment, the WTG 100 may be an onshore WTG. However, embodiments of the invention are not limited only to onshore WTG. In alternative embodiments, the WTG 100 may be an offshore WTG located over a water body such as, for example, a lake, an ocean, or the like. The tower 110 of such an offshore WTG is installed on either the sea floor or on platforms stabilized on or above the sea level.

The tower 110 of the WTG 100 may be configured to raise the nacelle 120 and the rotor 130 to a height where strong, less turbulent, and generally unobstructed flow of air may be received by the rotor 130. The height of the tower 110 may be any reasonable height, and should consider the length of WTG blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 1). The rotor hub 132 may be configured to couple the at least one blade 140 to a shaft (not shown). In one embodiment, the blades 140 may have an aerodynamic profile such that, at predefined wind speeds, the blades 140 experience lift, thereby causing the blades to radially rotate around the hub. The hub 132 may further comprise mechanisms (not shown) for adjusting the pitch of the blade 140 to increase or reduce the amount of wind energy captured by the blade 140. Pitching adjusts the angle at which the wind strikes the blade 140. In certain embodiments, however, the pitching mechanisms may be omitted and, consequently, the pitch of the blades 140 cannot be adjusted in such embodiments.

The hub 132 typically rotates about a substantially horizontal axis along a drive shaft (not shown) extending from the hub 132 to the nacelle 120. The drive shaft is usually coupled to one or more components in the nacelle 120, which are configured to convert the rotational energy of the shaft into electrical energy.

Although the WTG 100 shown in FIG. 1 has three blades 140, it should be noted that the WTG 100 may have a different number of blades. It is common to find WTGs having two to four blades. The WTG 100 shown in FIG. 1 is a Horizontal Axis Wind Turbine (HAWT) as the rotor 130 rotates about a horizontal axis. It should be noted that the rotor 130 may rotate about a vertical axis. Such a WTG having its rotor rotate about the vertical axis is known as a Vertical Axis Wind Turbine (VAWT). The WTG embodiments described henceforth are not limited to HAWTs having 3 blades. They may be implemented as both HAWTs and VAWTs, having any number of blades 140 in the rotor 130.

Each of the blades 140 may also be equipped with a stress sensor 142, such as a strain-gauge, accelerometer, vibration sensor, or the like, to detect stress experienced by the blade.

The stress sensor 142 may be positioned at a root end of the blade to sense stress due to a flap bending moment of the blade, i.e., a moment that causes the blade to deflect in a direction normal to the plane of the rotor 130. Although the WTG 100 is depicted as having only one stress sensor 142 on each blade 140, multiple stress sensors 142 may be included on each blade at various positions, e.g., at 20%, 40%, 50%, 60%, 75% and 80% of the blade radius from the blade root. Moreover, at least some of the multiple stress sensors 142 (or, alternatively, at least one additional stress sensor) may be positioned to measure an edge bending moment, i.e., a moment that causes the blade to deflect in a direction substantially within the plane of the rotor 130, rather than a flap bending moment. Alternatively, only one of the blades 140 may be equipped with one or more stress sensors 142.

Furthermore, instead of or in addition to positioning one or more stress sensors 142 on or within each blade 140, one or more stress sensors 142 may be placed at other locations on the WTG 100. For example, the WTG 100 may include a stress sensor 142 at the back of the nacelle 120, e.g., in the form of an accelerometer. In this embodiment the accelerometer 22 is mounted in such a way that horizontal or substantially horizontal oscillations of the nacelle—originating from edgewise oscillations of the blades—are detected. In addition, at least some of the stress sensors 142 may produce non-absolute values.

Figure 2:
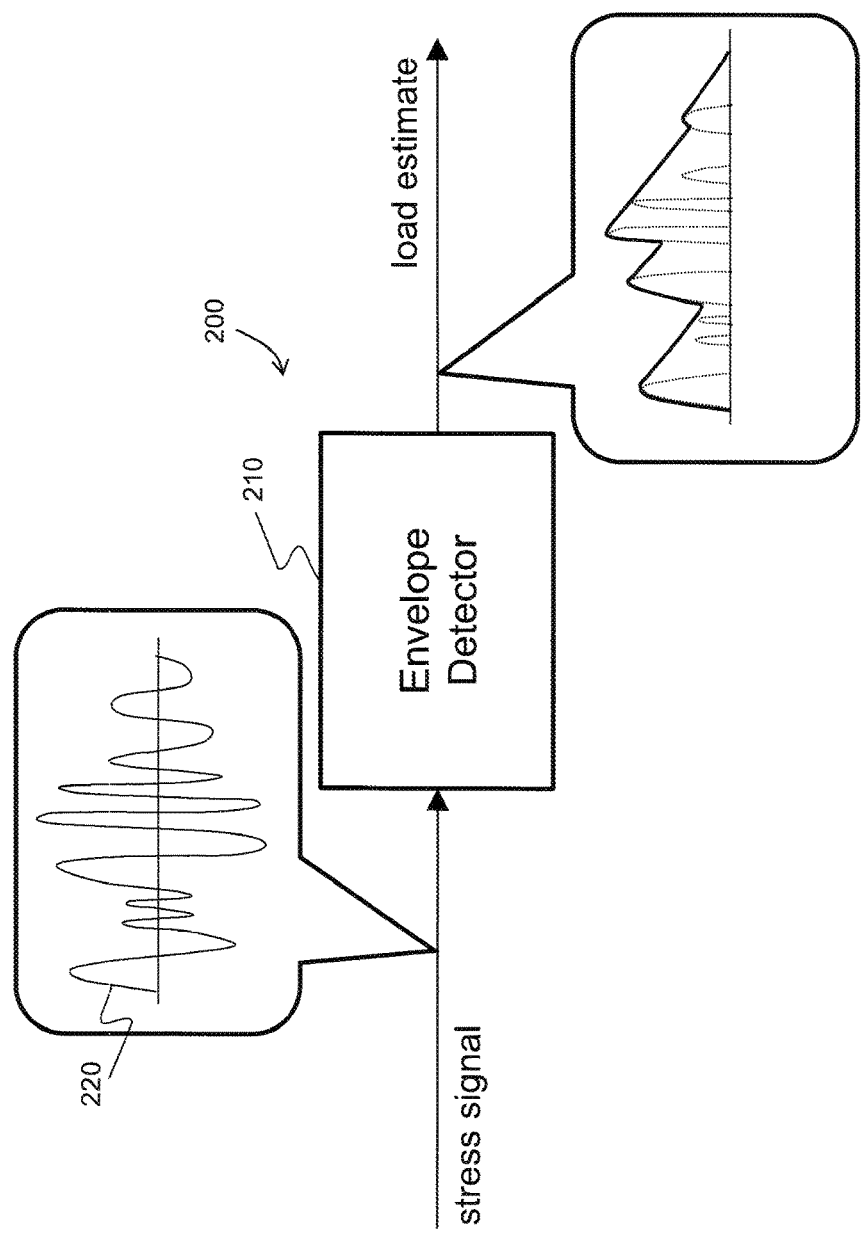
FIG. 2 shows a system for estimating a load experienced by at least a portion of a structure, such as the WTG of FIG. 1, according to an embodiment.

FIG. 2 shows a functional block diagram of an example system 200 that implements an example method of estimating an amount of loading experienced by at least a portion of a WTG or other structure. The system 200 includes an envelope detector 210, which receives a stress signal 220 characterizing instantaneous stress experienced by a component of the structure. The stress signal 220 and certain other signals shown in the figures are depicted graphically on an amplitude (y-axis) versus time (x-axis) graph, where the amplitude may be units of, for example, voltage, current, or power. If the structure for which at least a portion is experiencing loading is the WTG 100 of FIG. 1, the at least a portion of the structure for which loading is estimated may be the rotor 140 and/or the tower 110 of the WTG 100. The component that experiences stress characterized by the received instantaneous stress signal 220 may be an element of the at least a portion of the structure for which an amount of loading is being estimated. Alternatively, the component may be a different element of the structure but whose loading correlates with that of the at least a portion of the structure for which an amount of loading is being estimated. For example, the component may be a blade 140 and the at least a portion of the WTG 100 for which an amount of loading is being estimated may be the tower 110.

Furthermore, if the component whose stress is characterized by the instantaneous stress signal 220 is a blade 140, the stress signal 220 may be received from one of the stress sensors 142 positioned on one of the blades 140. However, in certain alternative embodiments the received stress signal 220 may be derived from multiple stress signals received from multiple stress sensors on a single blade or from multiple stress sensors on multiple blades. For example, the received stress signal 220 may be selected from among multiple candidate stress signals based on a predetermined criterion.

The envelope detector 210 detects an envelope 230 of the received stress signal 220 to produce an estimate of the amount of loading experienced by the at least a portion of the structure. The envelope detection may be performed continuously, i.e., in real-time or may be performed in a delayed fashion. Furthermore, the envelope detector 210 may include a half-wave rectifier that rectifies only have of the received waveform (as depicted) or may include a full-wave rectifier. Moreover, the received stress signal 220 may be analog or digital. For example, if the received stress signal 220 is digital, the envelope detector 210 may include a digital signal processor that implements the envelope detection digitally. On the other hand, if the received stress signal 220 is analog (as shown), the envelope detector 210 may implement envelope detection in an analog fashion or may digitally sample the received stress signal 220 and perform envelope detection digitally.

As illustrated by the load estimate output by the envelope detector 210, a decay time of the envelope detector 210 is longer than a rise time thereof. The decay time is analogous to a memory of the envelope detector and may be adjusted as necessary to adapt sensitivity of the system 200 to peaks in the stress signal 220. The decay time may be predetermined but may range from about a few seconds (e.g., five seconds) to several minutes (e.g., six minutes). One factor in setting the decay time is the desired degree of influence of large peaks on the load estimate. The influence of large peaks increases in proportion to the decay time. Furthermore, when estimating a load on the rotor of a WTG, it appears that a relatively longer decay time may provide a more accurate load estimate, particularly when fatigue loading experienced by the rotor is known to originate from periodic events in the wind field.

The envelope detector 210 may be implemented using a signal processing unit, where the term signal processing unit is not limited to just those integrated circuits referred to in the art as a computer, but broadly refers to a microcontroller, a microcomputer, a programmable logic controller (PLC), an application specific integrated circuit, and other programmable circuits. In another embodiment of the system 200, the envelope detector 210 is replaced with a signal processing unit that performs a different processing function. For example, a signal processing unit that performs standard deviation detection (i.e., a standard deviation detector) may continuously determine a standard deviation of the stress signal 220 received from a stress sensor on the component. The standard deviation of the received stress signal 220 provides a good estimate of an amount of loading experienced by the component because it is proportional to the size and number of stress cycles in the received stress signal 220. Another alternative to the envelope detector is a spectral moment calculator that calculates one or more spectral moments of the received stress signal 220. In one example embodiment the spectral moment calculator determines the Nth spectral moment, where N is the Wöhler coefficient corresponding to a material out of which the component is made.

Yet another alternative to envelope detection is the use of a rain-flow cycle counter that calculates a rain-flow cycle count of the received stress signal 220. When using the load estimate for a control purpose, the rain-flow cycle counter may be an on-line calculator in the sense that it updates the rain-flow cycle count on-line or continuously to provide a real-time load estimate. Load estimates produced by the rain-flow cycle counter respond more strongly to relatively large amplitude peaks in the received stress signal 220 than the standard deviation detector or the spectral moment calculator. Empirical testing has shown that such a strong response to relatively large amplitude peaks yields improved correlation between the load estimate and the actual loading experienced by the component. The envelope detector, depending on its decay time, can also be configured to respond strongly to relatively large amplitude peaks, but is less complex and therefore easier to implement than an online rain-flow cycle counter.

Some of the loading experienced by the component may be desired loading, i.e., loading that the component is intended to undergo and that is expected during normal operation of the structure. For example, a blade of a WTG is designed to bend and experience at least some cyclic loading in response to normal, expected changes in wind forces. An estimate of undesired loading experienced by the component, on the other hand, is of importance in the context of controlling loading. In that context, desired loading should be permitted whereas undesired loading should be minimized or at least kept under a threshold level to extend structure lifetime. The load estimate produced by the system 200, however, does not distinguish between desired loading and undesired loading.

Figure 3:
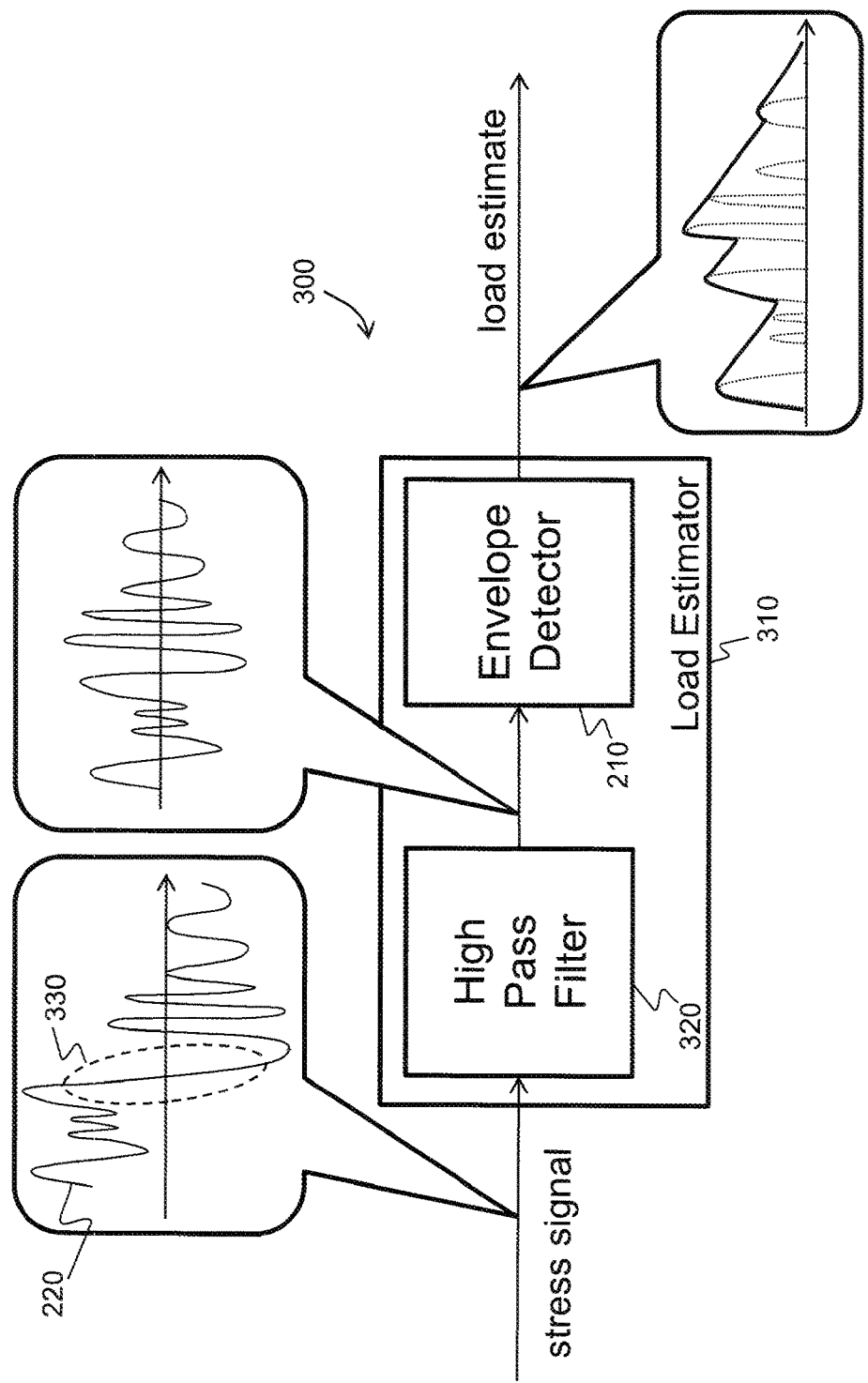
FIG. 3 shows another system for estimating a load experienced by at least a portion of a structure, such as the WTG of FIG. 1, in which a portion of a received stress signal corresponding to a desired loading is filtered out of the load estimate, according to another embodiment.

FIG. 3 shows a functional block diagram of a system 300 that implements another example method of estimating an amount of loading experienced by at least a portion of a structure in which the load estimate accounts for undesired loading only. The system 300 includes a load estimator 310, which includes the envelope detector 210 of the system 200 (or another alternative type of detector, as discussed above with reference to FIG. 2). However, the load estimator 310 also includes a high pass filter 320 that precedes the envelope detector 210 to filter out a portion of the received stress signal 220 that corresponds to desired loading experienced by the component before the stress signal 220 is processed by the envelope detector 210 or the like.

For example, when the component from which the stress signal 220 originates is a blade of a WTG, frequencies at the low end of the spectrum of the received stress signal 220 correspond to stresses occurring due to normal mean wind speed changes. A normal mean wind speed change is graphically represented in the middle of the stress signal 220 waveform at 330. Although a normal mean wind speed change results in some increase in fatigue loading this loading is desired and expected. Thus, the high pass filter 320 preceding the envelope detector 210 filters out a portion of the received stress signal 220 that corresponds to desired loading experienced by the component. Accordingly, the envelope detector 210 detects the envelope of a filtered stress signal in which at least a portion of the received stress signal 220 corresponding to desired loading is filtered out.

As noted above, desired loading experienced by a WTG blade is represented by the lower end of a corresponding stress signal's frequency spectrum. Accordingly, in the embodiment depicted, a high pass filter is used to filter out a portion of the received stress signal 220 corresponding to desired loading. However, in certain other structures, the desired loading may differ and therefore a different type of filter may be used instead. For example, desired loading may correspond to a higher end, a mid-range, or other select portions of the stress signal's frequency spectrum. Moreover, because a stress sensor producing the received stress signal 220 may contain noise and/or outlier data points, the load estimator 310 may include a filter that filters out a high frequency component of the received stress signal 220. Alternatively, the high pass filter 320 may be replaced with a bandpass filter that simultaneously filters out both low frequency components corresponding to desired loading and high frequency components corresponding to noise and/or outlier data points.

In the foregoing example embodiments a single stress signal is received to estimate loading. However, in WTGs and other structures, multiple stress signals from different stress sensors are often available. For example, as noted above, each blade of the rotor of a WTG may have one or more stress sensors.

Figure 4:
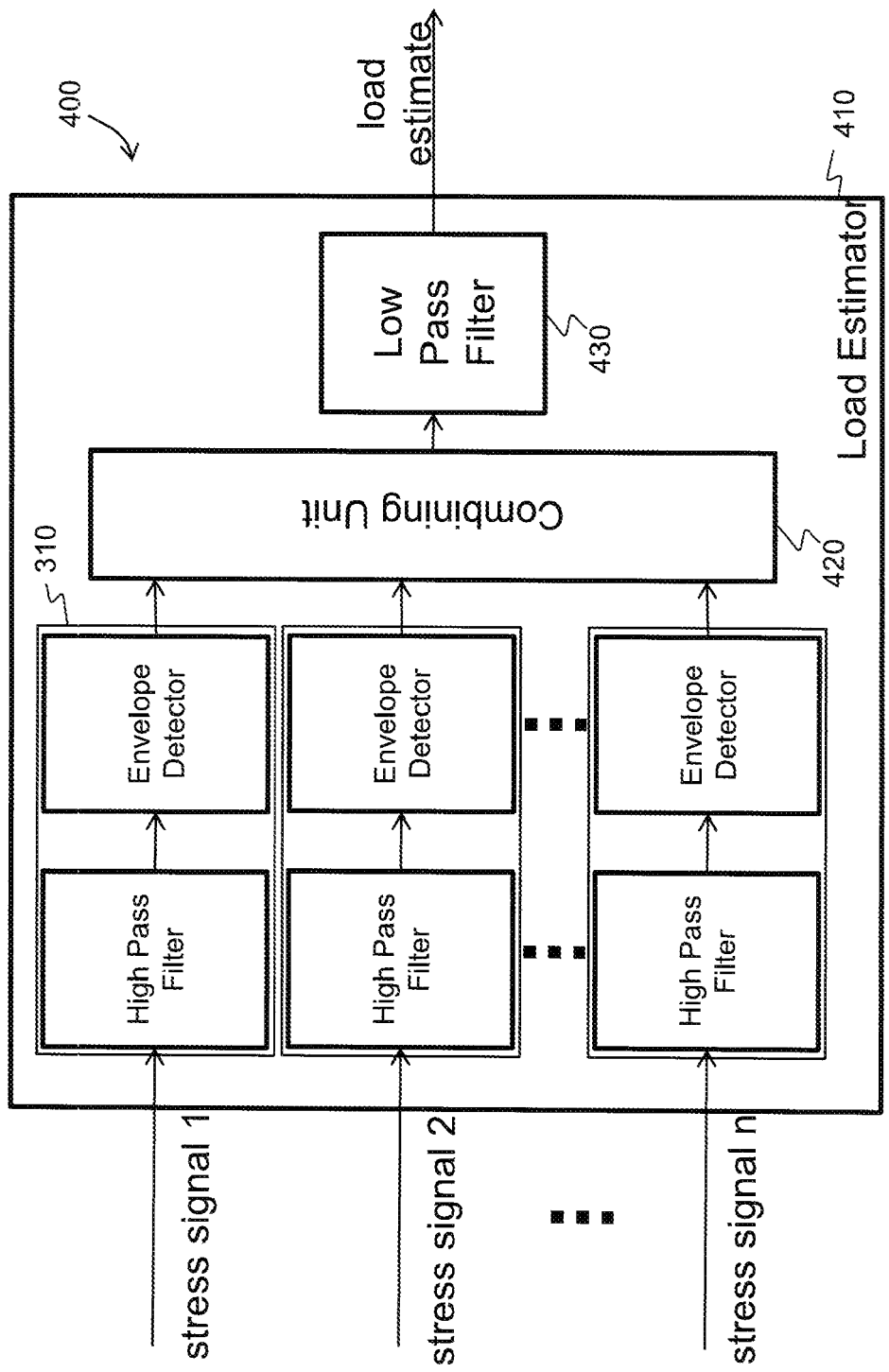
FIG. 4 shows another system for estimating a load experienced by at least a portion of a structure, such as the WTG of FIG. 1, in which the load estimate is based on multiple received stress signals, according to another embodiment.

FIG. 4 shows a system 400 including a load estimator 410 that implements another example method of estimating an amount of loading experienced by at least a portion of a structure, in which multiple stress signals are received. The load estimator 410 provides an estimate of undesired loading that is based on the multiple stress signals. For example, the load estimator 410 includes multiple instances of the load estimator 310 arranged in parallel, each outputting a load estimate based on a separately received stress signal. The load estimator 410 combines the various individual load estimates with a combining unit 420. The combining unit 420 may combine the load estimates by continuously selecting a maximum one of the load estimates to represent the undesired loading experienced by the structure or portion thereof. The maximum function of the combining unit 420 may alternatively be replaced with a weighted summation function or averaging function that combines the load estimates in some fashion. Also, the load estimator 410 may optionally include a low pass filter 430 that averages the output of the combining unit 410.

The stress signals received by the load estimator may include a stress signal from a stress sensor 142 on each of the blades of a WTG. Additionally, the stress signals may include a tilt load signal and/or a yaw load signal, which may be calculated based on the stress measurements from one or more stress sensors 142 and/or other sensors on the WTG. A tilt load signal processing path may use different high pass filter parameters, such as a different cutoff frequency, and/or different signal processing unit parameters, such as a different envelope time constant, than the blade load signal processing paths to account for the potentially different properties of the different stress signals. Similarly, the yaw load signal processing path may use different processing parameters than the blade load signal processing paths and/or the tilt load signal processing paths.

The load estimate produced by any of the foregoing systems may be logged for later use and/or study, e.g., to optimize site specific tuning of a WTG or to improve general knowledge of loading for a particular structure. Notably, however, each the different load estimating systems described above may generate load estimates with sufficient timeliness for control purposes, e.g., to control or reduce the actual load level.

Figure 5:
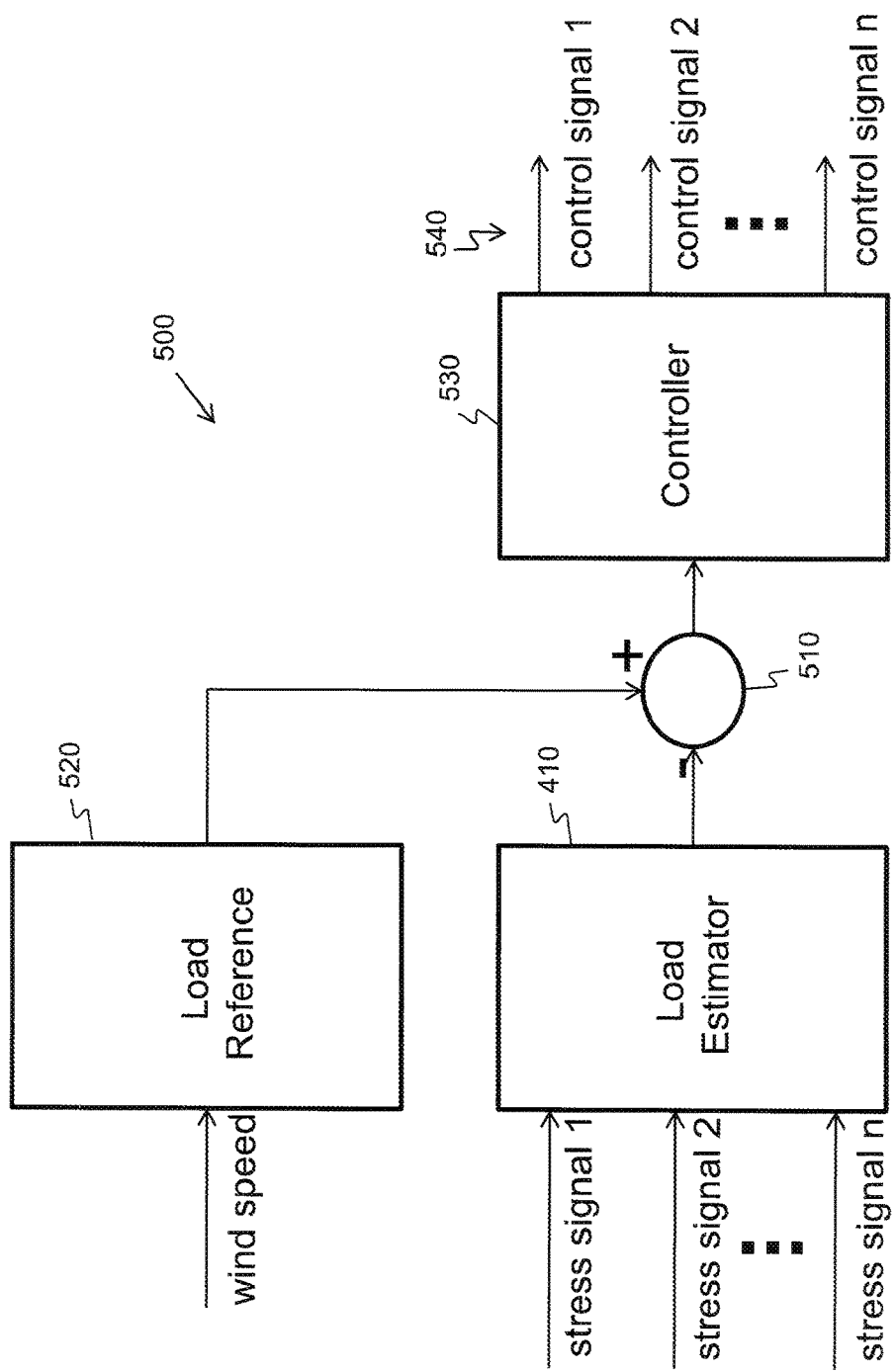
FIG. 5 shows a system for estimating and controlling a load experienced by at least a portion of a structure, such as the WTG of FIG. 1, according to another embodiment.

FIG. 5 shows a closed loop control system 500 that may interface with or being integrated with a structure to control loading experienced by the structure or a portion thereof. The control system 500 incorporates the load estimator 410 of FIG. 4. In particular, the load estimator 410 outputs a load estimate to a summer 510, which calculates an error by determining a difference between the output of the load estimator 410 and the reference output of a load reference unit 520. The summer 510 feeds the error to a controller 530. The controller 530 may be a proportional-integral controller or other type of controller and may output one or more control signals 540 to the structure. The controller may be implemented using one or more computers, microprocessors, PLCs (programmable logic arrays), or the like.

If the structure being controlled is a WTG (or portion thereof), the one or more control signals 540 may include a generator speed set point and/or a power set point. In principle, the controller 530 will drive a negative error to zero by reducing the generator speed set point and/or power set point (i.e., derating the WTG) or possibly shutting the WTG down. In certain embodiments, the controller 530 ignores a positive error because no harm is likely to result when the load estimate is below the reference level. In other embodiments, however, the controller 530 may react to a positive error by increasing the generator speed set point and/or power set point, which may in some circumstances result in overrating the WTG.

Figure 6:
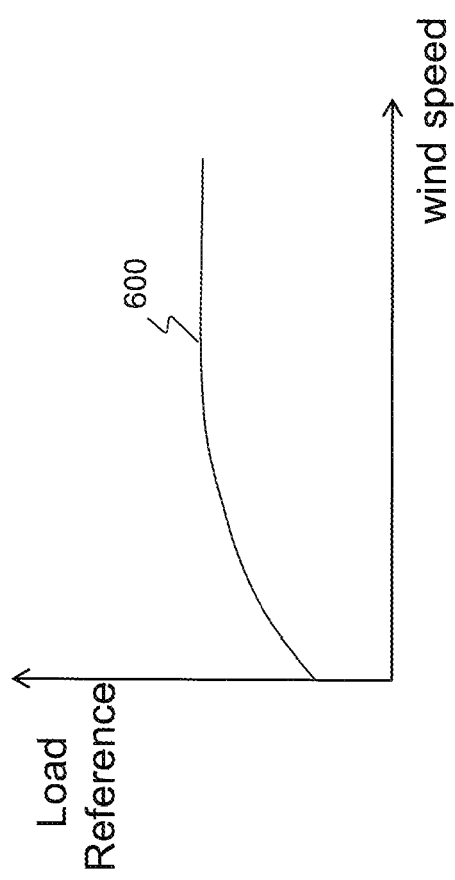
FIG. 6 illustrates an example load reference curve used by the load reference unit of the system shown in FIG. 5, according to an embodiment.

The reference level output by the load reference unit 520 may be a fixed predetermined value or may depend on an input variable, such as wind speed or some other indicator of climate severity. The wind speed may be measured, for example, by an anemometer nearby or on-board the WTG being controlled and such measurement is received by the load reference unit 520. FIG. 6 shows an example load reference curve 600 relating wind speeds to load reference values. The load reference curve 600 may be programmed or stored in a memory of load reference unit 520. In contrast to conventional WTGs, a WTG or portion thereof that is controlled by the control system 500 will experience loading at levels lower than the load reference curve 600. Thus, although wind conditions may increase in severity, loads will be maintained below the load reference curve 600.

In embodiments having a controller that reacts to both positive and negative errors, the same threshold curve 600 may be used as a reference. Consequently, loads experienced by the WTG or portions thereof will be maintained close to the load reference curve 600. Alternatively, a separate threshold curve or predetermined value may be stored in load reference unit 520 to be compared to the load estimate for determining whether to overrate the WTG. This second threshold may be lower than the threshold represented by the load reference curve 600, thereby creating a neutral band or area of load estimate values for which the controller neither overrates nor derates the WTG.

In embodiments in which the structure being controlled is not a WTG, the load reference curve 600 may depend on wind speed or some other input variable or variables. Alternatively, in both the WTG and other structures, the load reference curve 600 may be a value that is independent of any input variable.

The foregoing systems may be used to implement various different estimation and control methods.

Figure 7:
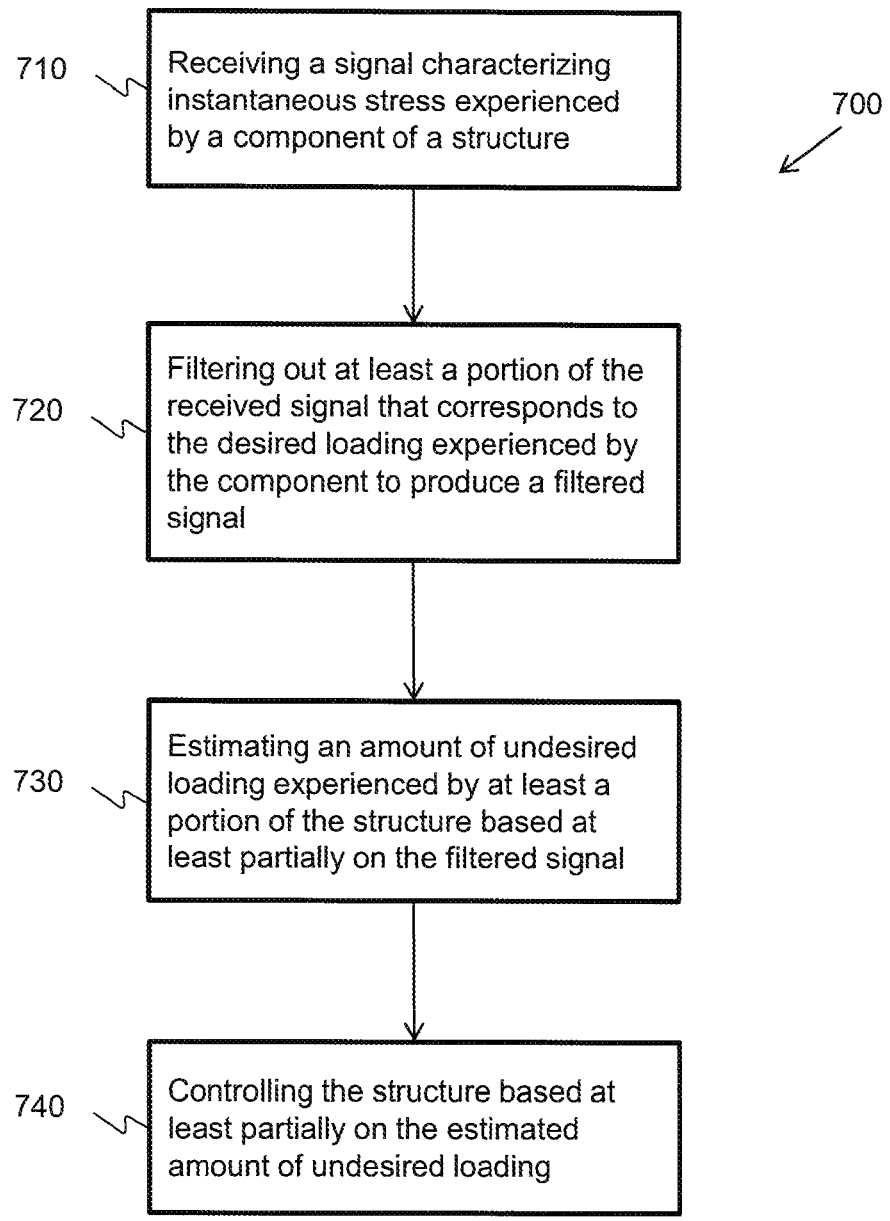
FIG. 7 illustrates a flow diagram representing an example method of estimating and controlling an amount of undesired loading experienced by at least a portion of a structure, according to an embodiment.

FIG. 7 shows a flow diagram representing a method 700 of estimating and controlling an amount of undesired loading experienced by at least a portion of a structure. The method may be carried out by the system 300 in FIG. 3, or by a portion of the system 400 in FIG. 4 or the system 500 in FIG. 5. At stage 710, a signal characterizing instantaneous stress experienced by a component of the structure is received. The signal may be received at a filter, such as the high pass filter 320 of the system 300. At stage 720, at least a portion of the received signal that corresponds to the desired loading experienced by the component is then filtered out to produce a filtered signal. The filtering function may be performed by the high pass filter 320. Next, at stage 730, the amount of undesired loading experienced by the at least a portion of the structure is estimated based at least partially on the filtered signal. The estimating function may be performed by detecting an envelope of the filtered signal using a signal processing unit, such as the envelope detector 210 of the system 300.

Alternatively, the amount of undesired loading may be estimated by calculating a standard deviation of the first filtered signal. In another embodiment, the amount of undesired loading may be estimated by calculating one or more spectral moments of the first filtered signal. Furthermore, the one or more spectral moments of the first filtered signal includes the Nth spectral moment, where N is the Wöhler coefficient corresponding to a material out of which the component is made. In yet another embodiment, the amount of undesired loading may be estimated by calculating an online rain-flow cycle count of the first filtered signal.

Once an estimate of an amount of undesired loading experienced by the at least a portion of the structure has been produced by the foregoing stages, at stage 740 a controller, such as the controller 530 of the system 500, may use the estimate, among other things, to control the amount of undesired loading. However, if an estimate is all that is needed (e.g., when logging data for later analysis) the step of controlling the structure (i.e., stage 740) may be omitted, in which case the method may be considered a method of estimating the amount of undesired loading, as opposed to a method of estimating and controlling the amount of undesired loading. In addition, or as an alternative, the step of filtering out at least a portion of the received signal that corresponds to the desired loading (stage 720) may be omitted from the method 700. The system 200 of FIG. 2, for example, shows a system that omits the filtering stage. Such a method may be implemented if a negligible amount or no amount of desired loading is expected.

In one embodiment, the structure being controlled is a WTG and controlling the structure includes overrating and/or derating the WTG. For example, the WTG may be derated if the estimated amount of undesired loading is higher than a predetermined threshold value and the WTG may be overrated if the estimated amount of undesired loading is lower than the predetermined threshold value. Alternatively, two predetermined threshold values may be used. For example, the WTG may be derated if the estimated amount of undesired loading is higher than a first predetermined threshold value and the WTG may be overrated if the estimated amount of undesired loading is lower than a second predetermined threshold value that is lower than the first predetermined threshold value.

Figure 8:
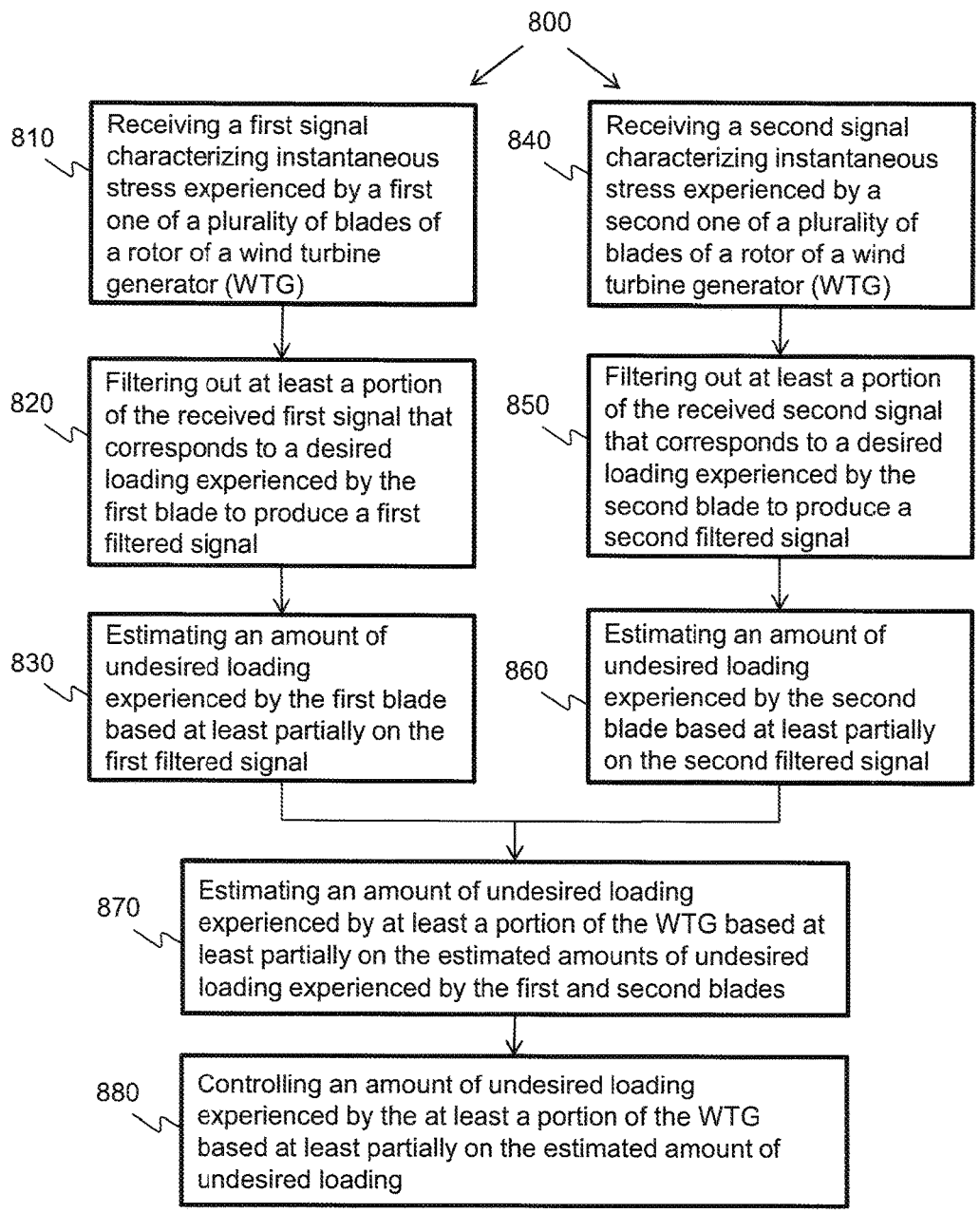
FIG. 8 illustrates a flow diagram representing an example method of estimating and controlling an amount of undesired loading experienced by at least a portion of a WTG, according to an embodiment.

FIG. 8 shows a flow diagram representing a method 800 of estimating and controlling an amount of undesired loading experienced by at least a portion of a WTG. The method may be carried out by the system 400 in FIG. 4 or a portion of the system 500 in FIG. 5. At stage 810, a first signal is received, the first signal characterizing instantaneous stress experienced by a first one of a plurality of blades of a rotor of the WTG. The first signal may be received at a first filter, such as a high pass filters in a first one of one of the load estimators 310 of the system 400. At stage 820, at least a portion of the received first signal that corresponds to the desired loading experienced by the first blade is then filtered out to produce a first filtered signal. The filtering function may be performed by the high pass filter in one of the load estimators 310. Next, at stage 830, the amount of undesired loading experienced by the first blade is estimated based at least partially on the first filtered signal. The estimating function may be performed by detecting an envelope of the filtered signal using a signal processing unit, such as the envelope detector in the first load estimator 310 in the system 400.

At stage 840, a second signal is received that characterizes instantaneous stress experienced by a second one of the plurality of blades. The second signal may be received in parallel with the first signal by a second high pass filter of a second load estimator 310, as depicted, for example, in the system 400 of FIG. 4. At stage 850, at least a portion of the received second signal that corresponds to desired loading experienced by the second blade is filtered out to produce a second filtered signal. The filtering function may be performed by the high pass filter of the second load estimator 310. At stage 860, an amount of undesired loading experienced by the second blade based at least partially on the second filtered signal is estimated, e.g., by the second load estimator 310. And, at stage 870, the amount of undesired loading experienced by the at least a portion of the WTG is estimated based at least partially on the estimated amounts of undesired loading experienced by the first and second blades. The estimation performed at stage 870 may be performed, for example, by the combining unit 420 in the system 400. Estimating the amount of undesired loading experienced by the at least a portion of the WTG at stage 870 may include selecting a maximum one of: 1) the estimated amount of undesired loading experienced by the first blade, and 2) the estimated amount of undesired loading experienced by the second blade.

At stage 880, an amount of undesired loading experienced by the at least a portion of the WTG is controlled based at least partially on the estimated amount of undesired loading produced at stage 870. The control function may be implemented by a controller, such as the controller 530 of the system 500. However, if an estimate is all that is needed (e.g., when logging data for later analysis) the step of controlling the structure (stage 880) may be omitted, in which case the method may be considered a method of estimating the amount of undesired loading, as opposed to a method of estimating and controlling the amount of undesired loading. In addition, or as an alternative, the steps of filtering out at least a portion of the received first and second signals that corresponds to the desired loading (stages 820 and 850) may be omitted from the method 800. The system 200 of FIG. 2, for example, shows a system that omits the filtering stage. Such a method may be implemented if a negligible amount or no amount of desired loading is expected.

Controlling (stage 880) the amount of undesired loading experienced may include overrating and/or derating the WTG. For example, the WTG may be derated if the estimated amount of undesired loading is higher than a predetermined threshold value, and the WTG may be overrated if the estimated amount of undesired loading is lower than the predetermined threshold value. Alternatively, in a further embodiment, controlling the amount of undesired loading experienced includes derating the WTG if the estimated amount of undesired loading is higher than a first predetermined threshold value, and overrating the WTG if the estimated amount of undesired loading is lower than a second predetermined threshold value that is lower than the first predetermined threshold value.

Although the method 800 is described above with reference to only two undesired loading estimates corresponding to two blades of a WTG rotor, the method may be modified to include estimating one or more additional undesired loading estimates corresponding to one or more additional blades of a WTG rotor. Furthermore, the amount of undesired loading experienced by the at least a portion of the WTG may be estimated based at least partially on not only the estimated amounts of undesired loading experienced by the first and second blades but also based at least partially on the one or more additional undesired loading estimates corresponding to the one or more additional blades. For example, a maximum one of the undesired loading estimates may be taken as the estimated amount of undesired loading experienced by the at least a portion of the WTG.

Figure 9:
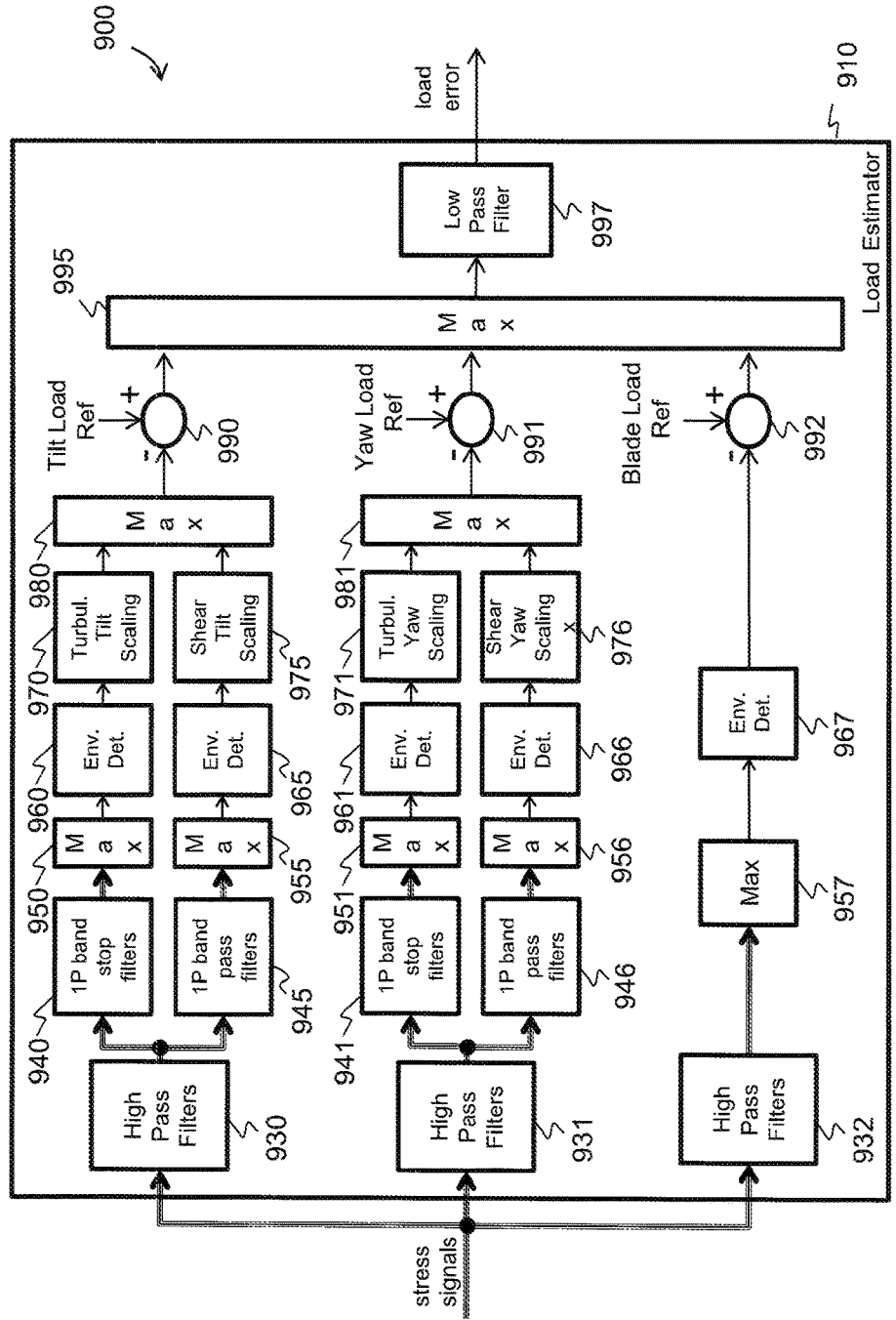
FIG. 9 shows another system for estimating a load experienced by at least a portion of a structure, such as the WTG of FIG. 1, in which the load estimate is adjusted to account for wind phenomenon-dependent biases, according to another embodiment.

FIG. 9 shows a system 900 including a load estimator 910 that implements another example method of estimating an amount of loading experienced by at least a portion of a structure. As will be explained in more detail below, the load estimator 910 improves the load estimate of the load estimator 410 by correcting a wind phenomenon-dependent bias.

Figure 10:
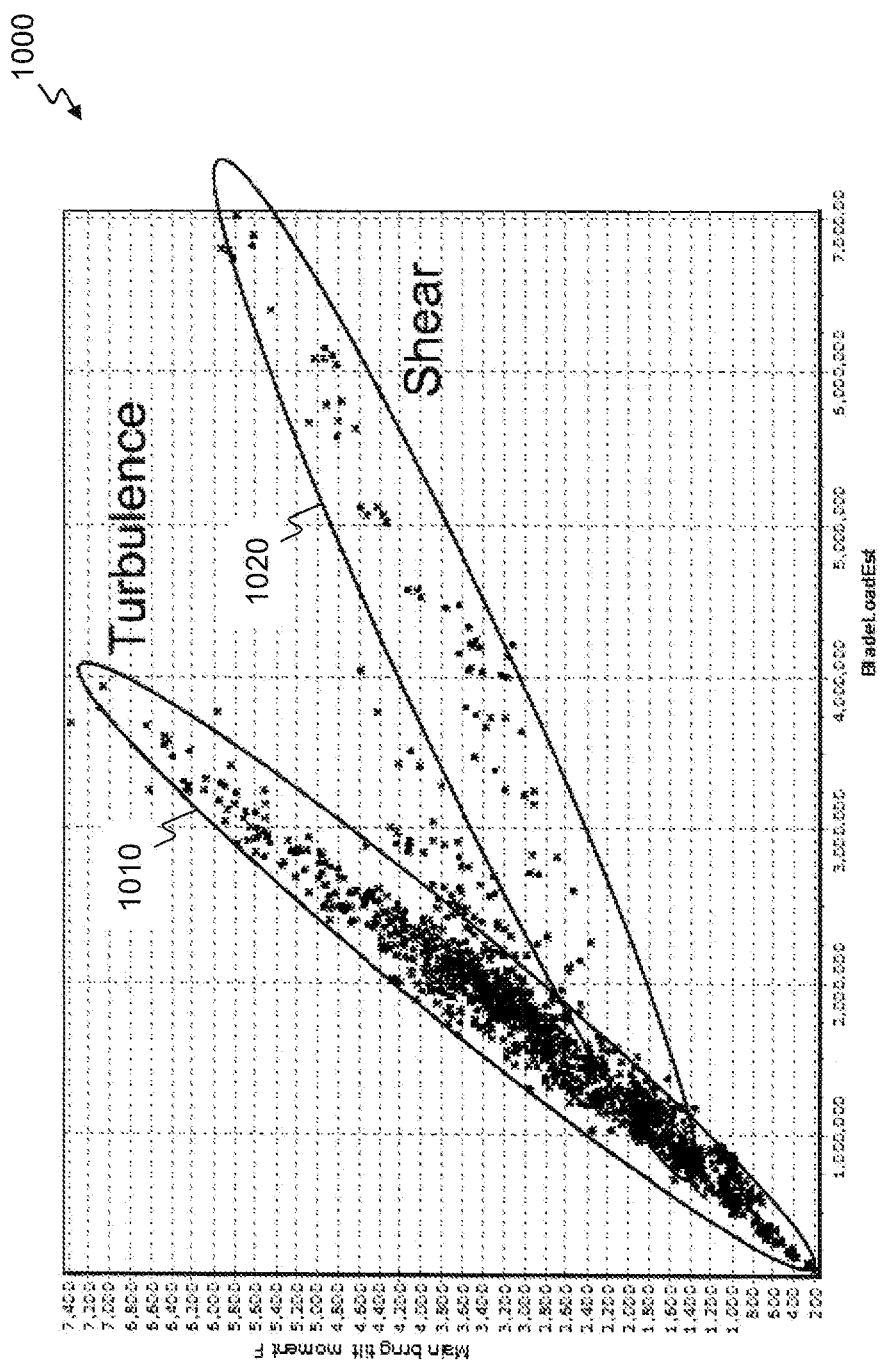
FIG. 10 shows a graph that illustrates a wind phenomenon-dependent bias that can exist in a load estimate produced by the system of FIG. 4.

A scatter plot 1000 in FIG. 10, generated by simulation experiments, illustrates the presence of the wind phenomenon-dependent bias of the load estimate produced by the load estimator 410. In the scatter plot 1000, the vertical axis corresponds to a tilt moment magnitude (measured in kilo newton meters) experienced by a WTG portion, such as the rotor 130, and the horizontal axis corresponds to the uncorrected load estimate. As shown in the scatter plot 1000, the load estimate correlates highly with the tilt moment magnitude along a first trend line corresponding to a first group of scatter plot points 1010 and along a second trend line corresponding to a second group of scatter plot points 1020. The first group of scatter plot points 1010 differs from the second group 1020 in that each corresponds to loads caused by a different dominant wind phenomenon. The first group 1010 corresponds to loads caused by turbulence in the wind, whereas the second group 1020 corresponds to loads caused by wind shear.

On a WTG, one way to detect whether wind-related loads on a blade are caused by turbulence or wind shear is to analyze a frequency of a stress signal that measures loading on the blade. Loads caused by wind shear will be exhibited by frequency content in a blade stress signal at or near the rotational frequency (i.e., 1P) of the rotor 130 because wind shear causes loads on a blade to fluctuate at the 1P frequency. Turbulence, on the other hand, causes the stress signal to fluctuate at a broad range of frequencies. Accordingly, frequency-selective filtering of blade stress signals can separate portions of the blade stress signals that are caused by wind shear from those portions that are caused due to turbulence. Each wind phenomenon-dependent portion of the stress signal may then be used to produce a different wind phenomenon-dependent load estimate and each wind phenomenon-dependent load estimate may then be scaled or weighted differently to equalize their influence on an overall load estimate. (Alternatively, in some contexts it may be desirable to enhance or only partially equalize the wind-dependent bias of the load estimate rather than completely equalize it.)

Referencing FIG. 9 again, the load estimator 910 provides an estimate of undesired loading that is based on one or more stress signals from one or more blades of a WTG. Moreover, the load estimator 910 distinguishes between loads caused by different wind phenomena so that the influence of each type of loading can be weighed differently when producing the load estimate. The load estimator 910 receives one or more stress signals 920 (e.g., one from each of multiple blades on a WTG, such as the WTG 100) and each of the one or more stress signals 920 is fed to a different one of three signal paths: a tilt load estimating path, a yaw load estimating path, and a blade load estimating path, depicted in that order starting at the top of FIG. 9 and moving toward the bottom.

The tilt load estimating path will first be described, followed by the yaw load estimating path, and finally the blade load estimating path. First, in the tilt load estimating path, a set of high pass filters 930 includes multiple instances of the high pass filter 320 arranged in parallel, each instance receiving a different one of the stress signals 920 and outputting a high pass filtered version of the received stress signal 920. The high pass filtered stress signals are fed to each of a pair of frequency selective filter sets—a set of 1P band stop filters 940 and a set of 1P band pass filters 945. Each filter in the set of 1P band stop filters 940 filters a different one of the high pass filtered stress signals corresponding to a different one of the stress signals 920. Similarly, each filter in the set of 1P band pass filters 945 filters a different one of the high pass filtered stress signals corresponding to a different one of the stress signals 920. As explained above with reference to FIG. 10, the frequency selective filters 940 and 945 separate portions of the high pass filtered stress signals that are caused by wind shear from those portions that are caused by turbulence. More specifically, each of the 1P band stop filters 940 has a notch centered around the rotational frequency of the rotor and, therefore, filters out wind shear related portions (thereby outputting turbulence related portions). Conversely, each of the 1P band pass filters 945 has a pass band centered around the rotational frequency of the rotor and, therefore, filter out turbulence related portions (thereby outputting wind shear related portions). In one embodiment, the rotational frequency of the rotor is a predetermined value. In other embodiments, however, the rotational frequency may vary and is, therefore, measured and input to a dynamically reprogrammable device, such as a digital signal processor, that dynamically implements the frequency selective filters 940 and 945.

Next, a first maximizing unit 950 selects a maximum one of the filtered stress signals output by the 1P band stop filters 940 and a second maximizing unit 955 selects a maximum one of the filtered stress signals output by the 1P band pass filters 945. (Alternatively, the first and/or second maximizing units 950 and 955 may be replaced with another functional block that performs another function, such as a weighted summation or an averaging function.) If, however, the stress signals 920 include only a single stress signal, the maximizing units 950 and 955 may be omitted.

A first envelope detector 960, which is an instance of the envelope detector 210 described above, then detects an envelope of the maximum signal output by the first maximizing unit 950 and a second envelope detector 965, which is similarly an instance of the envelope detector 210, detects an envelope of the maximum signal output by the second maximizing unit 955. Alternatively, as discussed above with reference to the envelope detector 210, the first and/or second envelope detectors 960 and 965 may be replaced with a signal processing unit that performs a different processing function.

A scaling or weighting function is then performed on each of the outputs of the envelope detectors 960 and 965 by a turbulence tilt scaling unit 970 and a shear tilt scaling unit 975, respectively. As discussed above, with respect to FIG. 10, different types of wind phenomena causing a load or stress can influence the load estimate differently. Thus, the scaling factors applied by the scaling units 970 and 975 may be set to equalize the different biases that each wind phenomenon has on an overall load estimate. (Alternatively, the wind phenomenon-dependent biases may be enhanced or only partially equalized, depending on the control goals and/or design constraints.) In addition, the wind phenomenon-dependent biases with respect to estimating a tilt moment may differ from wind phenomenon-dependent biases with respect to estimating a yaw moment. Accordingly, the scaling factors applied by the scaling units 970 and 975 are designed to improve a tilt moment estimate. (Similarly, as discussed below, the corresponding scaling units 971 and 975 in the yaw load estimating path apply scaling factors that are designed to improve a yaw moment estimate.)

A maximum one of the tilt load estimates output by the scaling units 970 and 975 is selected by a maximizing unit 980. A tilt load estimate summer 990 calculates a tilt load estimate error by determining a difference between the maximum tilt load estimate and a tilt load reference. The tilt load reference may be a fixed predetermined value or may depend on an input variable, such as wind speed or some other indicator of climate severity. For example, the tilt load reference may be generated by a load reference unit, such as the load reference unit 520, which relates wind speeds to load reference values according to a load reference curve, such as the curve 600 in FIG. 6. A similar process is carried out by the elements of the yaw load estimating path and by the elements of the blade load estimating path to generate a yaw load estimate error and a blade load estimate error for comparison with the tilt load estimate error.

A maximum one of the errors is selected as a load error by a maximizing unit 995. Moreover, an optionally included low pass filter 997 may average the maximum error signal output by the maximizing unit 995. A controller (not shown) uses the load error of the load estimator 910 as a control handle to control a generator speed reference and/or power reference of the WTG 100, as described above with reference to the controller 530. In addition, or alternatively, the load estimates and/or the load error produced by the system 900 may be logged for later use and/or study, e.g., to optimize site specific tuning of a WTG or to improve general knowledge of loading for a particular structure.

It should be noted that one or more of the load estimate paths may be omitted in some embodiments. Therefore, in an alternative embodiment of the system 900, only a single one of the three load estimate paths is included and the other two are omitted, obviating the need for the maximizing unit 995. In yet another alternative embodiment, one of the three load estimate paths is omitted.

Moreover, in certain embodiments one or more elements of each load estimate paths that is redundant with an element in another one of the paths may be omitted and replaced with the output of the redundant element of the other path. For example, the high pass filters 931 and 932 may be omitted by feeding the outputs of the high pass filters 930 to the elements that would have received the outputs of the high pass filters 931 and 932. In a similar manner, portions of either the tilt load estimating path or the yaw load estimating path that feed signals to the scaling units 970, 971, 975, and 975 may be omitted.

Additional modifications to the system 900 are also possible. For example, in one embodiment, the band stop filters 940 may be omitted when a scaling factor applied by the shear tilt scaling unit 975 is higher than the scaling factor of the turbulence tilt scaling unit 970. In such a configuration, the band stop filters 940 may be omitted due to their muted effect on which output is selected by the maximizing unit 980—the higher scaling factor applied on the shear load estimate path will likely cause the shear load estimate to be selected over the turbulence load estimate when 1P frequency content is dominant in the stress signals. The same can be said for the yaw load estimate path, as well, and therefore, in certain embodiments, the band stop filters 941 on the yaw load estimate path may also be omitted.

Moreover, because the band pass filters 945 and 946 inherently perform the high pass filtering function of the high pass filters 930 and 931, the band pass filters 945 and 946 may be configured to directly receive the stress signals, circumventing the high pass filters 930 and 931. In addition, or as an alternative, the high pass filters 930, 931, 932, may be entirely omitted from the load estimator 910 if, for example, a negligible amount or no amount of desired loading is expected to occur. Also, other wind phenomena may be taken into account besides turbulence and wind shear. For example, wind gusts, extreme drops in wind velocity, extreme directional changes, etc., may be accounted for by the system 900 using sensors and filters or other signal processing elements.

As mentioned above, one or more signal processing units may be used to implement the envelope detectors 960, 961, 965, 966, and 967. The same one or more signal processing units may also be used to implement other processing functions of the load estimator 910, such as one or more of the scaling units 970, 971, 975, 976, one or both of the estimate summers 990, 991, 992, and/or one or more of the maximizing units 950, 951, 955, 956, 957, 980, 981, 995.

Figure 11:
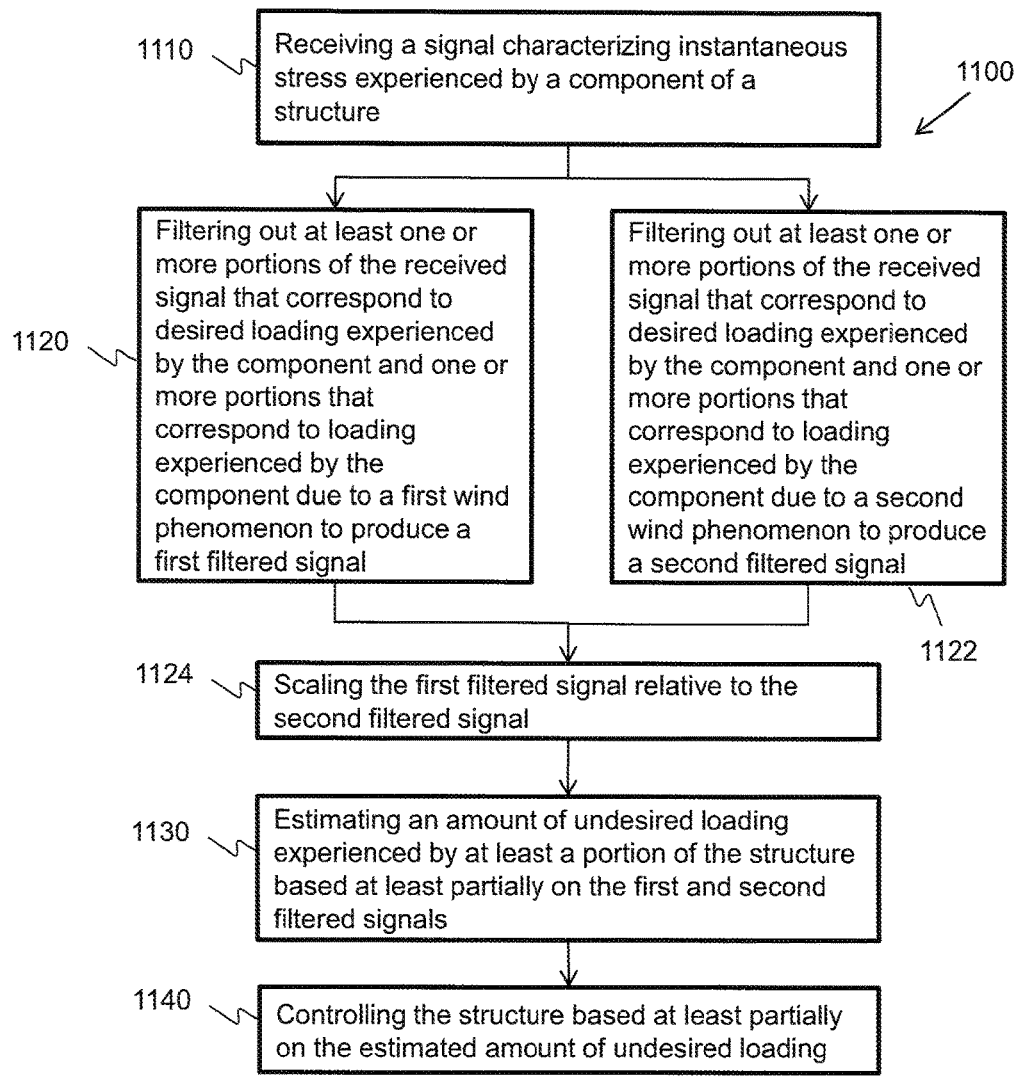
FIG. 11 illustrates a flow diagram representing an example method of estimating and controlling an amount of undesired loading experienced by at least a portion of a structure, according to an embodiment.

FIG. 11 shows a flow diagram representing a method 1100 of estimating and controlling an amount of undesired loading experienced by one or more blades of a WTG. The method 1100 may be carried out by the system 900 in FIG. 9. At stage 1110, one or more signals characterizing instantaneous stress experienced by the one or more blades or other portions of the WTG are received. The signals may be received at one or more filters, such as the high pass filters 930, 931, and 932 of the system 900. At stage 1120, at least one or more portions of each of the one or more received signals are filtered out to produce a first filtered signal. The one or more filtered out portions include one or more portions that correspond to the desired loading experienced by the one or more blades and one or more portions that correspond to loading experienced by the one or more blades due to a first wind phenomenon, which may be turbulence or wind shear.

At stage 1122, carried out simultaneously with stage 1120, at least one or more portions of each of the one or more received signals are filtered out to produce a second filtered signal. The one or more filtered out portions include one or more portions that correspond to the desired loading experienced by the one or more blades and one or more portions that correspond to loading experienced by the one or more blades due to a second wind phenomenon, which may be turbulence (if the first phenomenon is wind shear) or wind shear (if the first phenomenon is turbulence). Next, at stage 1124, the first filtered signal is scaled relative to the second filtered signal. For example, the first filtered signal may be scaled, the second filtered signal may be scaled, or both may be scaled by different factors. By appropriately configuring the relative scaling, an effect of different wind phenomena on the load estimate may be tuned to enhance or cancel out wind phenomenon-dependent biases otherwise existing in the load estimate.

The function of filtering out the one or more portions that correspond to the desired loading at stages 1120 and 1122 may be implemented with the high pass filters 930, 931, and 932. Moreover, the function of filtering out one or more portions that correspond to loading experienced due to the first and second wind phenomena at stages 1120 and 1122 may be implemented with the frequency-dependent filters, such as the 1P band stop and 1P band pass filters 940, 941, 945, and 946.

Next, at stage 1130, the amount of undesired loading experienced by the at least a portion of the structure is estimated based at least partially on the scaled first and second filtered signals. The estimating function may be performed by detecting an envelope of the filtered signal, for example, and may be implemented with a signal processing unit. Once an estimate of an amount of undesired loading experienced has been produced by the foregoing stages, at stage 1140 a WTG controller may use the estimate, among other things, to control the amount of undesired loading. However, if an estimate is all that is needed (e.g., when logging data for later analysis) the step of controlling the structure (i.e., stage 1140) may be omitted, in which case the method may be considered a method of estimating the amount of undesired loading, as opposed to a method of estimating and controlling the amount of undesired loading.

Example methods and systems described herein may be used to accurately estimate loads experienced by a structure. In certain embodiments, only undesirable loads are estimated and, optionally, controlled. Also, the loads that are controlled are not necessarily the same loads characterized by a received stress signal. For example, a high correlation exists between blade loads on a WTG and other important mechanical loads including, e.g., tilt, yaw, and tower loads. Thus, the control system 500 may be used for controlling loads experienced by structural parts of the WTG other than individual blades or the rotor. For example, bearings and/or rotating shafts of the rotor may also experience loading, which may be controlled for instead of the loading experienced by blades. In addition, types of sensors and locations of such sensors other than those described herein may be used to sense stress and produce signals characterizing instantaneous stress. For example, one or more proximity sensors located on a stationary frame proximate to a flange of a rotating shaft of a WTG's rotor may sense a deflection of the shaft and produce a signals characterizing instantaneous stress experienced by the shaft.

Moreover, the controller 530 of the control system 500 may not directly control for extreme loads experienced by a WTG because, in general, derating of power and speed will happen very slowly compared to events causing extreme loading. However, a high correlation often exists between a high level of blade load fatigue cycles and the risk of extreme loading. Therefore, extreme loads are arguably controlled indirectly when controlling fatigue loads.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

What is claimed is:

1. A computer-implemented method of estimating and controlling an amount of undesired loading experienced by at least a component of a structure, wherein the structure is a wind turbine generator (WTG) and the component is a first blade of a plurality of blades of a rotor of the WTG, the method comprising:

for each blade of (i) the first blade and (ii) a second blade of the plurality of blades:
receiving a respective signal characterizing an instantaneous stress experienced by the blade;
filtering, using a computer processor, frequencies from the respective received signal to produce a respective filtered signal in which at least frequencies that correspond to a desired loading experienced by the blade are removed;
estimating, using the computer processor, an amount of undesired loading experienced by the blade based at least partially on the respective filtered signal, wherein estimating the amount of undesired loading experienced by the blade comprises one of:
calculating a standard deviation of the respective filtered signal;

calculating one or more spectral moments of the respective filtered signal, wherein the one or more spectral moments of the respective filtered signal includes the Nth spectral moment, where N is the Wöhler coefficient corresponding to a material out of which the blade is made;

detecting a value of an envelope of the respective filtered signal; and calculating an online rain-flow cycle count of the respective filtered signal;

estimating the amount of undesired loading experienced by the at least the component of the structure based at least partially on the estimated amounts of undesired loading of the first blade and of the second blade; and operating the structure based on the estimated amount of undesired loading experienced by the at least the component of the structure.

2. The method according to claim 1, wherein the first signal characterizing instantaneous stress experienced by the component is received from a strain gauge disposed on the component.

3. The method according to claim 1, wherein the frequencies of the respective received signal that are filtered out includes signal components of the respective received signal that are below a predetermined threshold frequency.

4. The method according to claim 1, wherein operating the structure based on the estimated amount of undesired loading comprises controlling the amount of undesired loading experienced by the at least the component of the structure based at least partially on the estimated amount of undesired loading.

5. The method according to claim 4, wherein controlling the amount of undesired loading experienced includes at least one of overrating and derating the WTG.

6. The method according to claim 4, wherein estimating the amount of undesired loading experienced by the at least the component of the structure includes selecting a maximum one of a set of loading estimates, the set including:
(i) the estimated amount of undesired loading experienced by the first blade; and
(ii) the estimated amount of undesired loading experienced by the second blade,
wherein controlling the amount of undesired loading experienced includes comparing the maximum undesired loading estimate to a reference level.

7. The method according to claim 1, wherein filtering frequencies from the respective received signal includes filtering the respective received signal to remove one or more frequencies that correspond to loading experienced by the respective blade due to a first wind phenomenon,
wherein the first wind phenomenon is one of turbulence and wind shear.

8. The method according to claim 7, further comprising, for at least one blade of the first blade and the second blade:
filtering the respective received signal to produce a second filtered signal in which at least the following signal frequencies are removed:
one or more frequencies of the respective received signal that correspond to the desired loading experienced by the respective blade; and
one or more frequencies of the respective received signal that correspond to loading experienced by the respective blade due to a second wind phenomenon, the second wind phenomenon being the other of turbulence and wind shear; and
scaling the respective filtered signal relative to the second filtered signal, wherein estimating the amount of undesired loading experienced by the at least the component of the structure is based at least partially on the scaled respective filtered signal and on the second filtered signal.

9. The method according to claim 8,
wherein the one or more frequencies that correspond to loading experienced by the respective blade due to the first wind phenomenon include frequency components of the respective received signal that are within a pass band centered around a rotational frequency of the rotor, and
wherein the one or more frequencies that correspond to loading experienced by the respective blade due to the second wind phenomenon include frequency components of the respective received signal that are outside a stop band centered around the rotational frequency of the rotor.

10. A system for controlling an amount of undesired loading experienced by at least a component of a structure, the system comprising:
a load estimator configured to estimate the amount of undesired loading experienced by the at least the component of the structure based at least partially on an estimate of the amount of undesired loading experienced by the component of the structure; and
a controller configured to control the amount of undesired loading experienced by the at least the component of the structure based at least partially on the estimated amount of undesired loading experienced by the at least the component of the structure,
wherein the load estimator comprises:
a first filter module configured to produce a first filtered signal by filtering out one or more frequencies of a first signal, the first signal characterizing instantaneous stress experienced by the component of the structure, and the one or more filtered out frequencies including frequencies corresponding to the desired loading experienced by the component; and
a first signal processing unit configured to process the first filtered signal to produce the estimate of the amount of undesired loading experienced by the component, wherein the first signal processing unit estimates the amount of undesired loading experienced by the component by one of:
calculating a standard deviation of the first filtered signal;
calculating one or more spectral moments of the first filtered signal, wherein the one or more spectral moments of the first filtered signal includes the Nth spectral moment, where N is the Wöhler coefficient corresponding to a material out of which the component is made;
detecting a value of an envelope of the first filtered signal; and
calculating an online rain-flow cycle count of the first filtered signal, and
wherein the controller adjusts operation of the structure based on the estimate of the amount of undesired loading experienced by the component.

11. The system according to claim 10, wherein the structure is a wind turbine generator (WTG) and the component is a first one of a plurality of blades of a rotor of the WTG, and wherein the load estimator further comprises:
a second filter module configured to produce a second filtered signal by filtering out one or more frequencies of a second signal, the second signal characterizing instantaneous stress experienced by a second one of the plurality of blades, and the one or more filtered out frequencies including frequencies corresponding to a desired loading experienced by the second blade; and a second signal processing unit configured to process the second filtered signal to produce an estimate of an amount of undesired loading experienced by the second blade, wherein the second signal processing unit estimates the amount of undesired loading experienced by the second blade by one of:

calculating a standard deviation of the second filtered signal;

calculating one or more spectral moments of the second filtered signal, wherein the one or more spectral moments of the second filtered signal includes the Nth spectral moment, where N is the Wöhler coefficient corresponding to a material out of which the component is made;

detecting a value of an envelope of the second filtered signal; and calculating an online rain-flow cycle count of the second filtered signal, wherein the load estimator is configured to estimate the amount of undesired loading experienced by the at least the component of the WTG based at least partially on the estimate of the amount of undesired loading experienced by the first blade and the estimate of the amount of undesired loading experienced by the second blade.

12. The system according to claim 10, wherein the structure is a wind turbine generator (WTG) having a rotor and the component is a blade of the rotor, and wherein the one or more frequencies of the first signal filtered out by the first filter module include one or more frequencies that correspond to loading experienced by the component due to a first wind phenomenon, wherein the first wind phenomenon is one of turbulence and wind shear.

13. The system according to claim 12, wherein the first filter module is further configured to produce a second filtered signal by filtering out the frequencies corresponding to the desired loading experienced by the component and frequencies of the first signal that correspond to loading experienced by the component due to a second wind phenomenon, and wherein the first signal processing unit of the load estimator is further configured to:

scale the first filtered signal relative to the second filtered signal, and process the scaled first filtered signal and the second filtered signal to produce the estimate of the amount of undesired loading experienced by the component.

14. A method for use with a structure comprising a component, the method comprising:

receiving a signal characterizing instantaneous stress experienced by the component of the structure;

filtering, using a computer processor, frequencies from the received signal to produce a filtered signal in which at least frequencies that correspond to desired loading experienced by the component are removed;

detecting, using a detector having a rise time and a decay time that is longer than the rise time, a value of an envelope of the filtered signal to produce an estimate of the amount of loading experienced by the component of the structure; and operating the structure based on the estimated amount of loading.

* * * * *